United States Patent
Nawamoto et al.

(10) Patent No.: US 6,431,760 B1
(45) Date of Patent: Aug. 13, 2002

(54) ANGULAR TYPE BALL BEARING AND SHAFT SUPPORT STRUCTURE WITH THE SAME

(75) Inventors: Taikou Nawamoto; Hideto Yui, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 57 days.

(21) Appl. No.: 09/661,198

(22) Filed: Sep. 13, 2000

(30) Foreign Application Priority Data

Sep. 13, 1999 (JP) ............................................. 11-259235
Aug. 10, 2000 (JP) ........................................ 2000-242827

(51) Int. Cl.[7] ............................ F16C 33/58; F16C 33/66
(52) U.S. Cl. ........................ 384/513; 384/475; 384/504; 384/520
(58) Field of Search ................................. 384/462, 466, 384/468, 474, 475, 504, 513, 516, 520

(56) References Cited

U.S. PATENT DOCUMENTS

| | | | | |
|---|---|---|---|---|
| 2,825,200 A | * | 3/1958 | Boullion | ..................... 384/520 |
| 3,157,442 A | | 11/1964 | Gaubatz | |
| 3,195,965 A | * | 7/1965 | Van Dorn | ................... 384/475 |
| 5,834,662 A | * | 11/1998 | Stoll et al. | ................... 384/513 |
| 5,951,173 A | * | 9/1999 | Matsui et al. | ............... 384/450 |

FOREIGN PATENT DOCUMENTS

| | | | |
|---|---|---|---|
| DE | 530 380 C | 7/1931 | |
| DE | 23 29 911 A1 | 1/1975 | |
| JP | 5-60145 | 3/1993 | ........... F16C/33/66 |
| JP | 5-263830 | 10/1993 | ........... F16C/33/66 |
| JP | 6-235425 | 8/1994 | ........... F16C/33/66 |
| JP | 6-264934 | 9/1994 | ........... F16C/33/66 |
| JP | 8-312657 | 11/1996 | ........... F16C/37/00 |
| JP | 10-37951 | 2/1998 | ........... F16C/19/18 |
| JP | 63-180726 | 11/1998 | ........... F16C/33/66 |

OTHER PUBLICATIONS

Japanese Abstract No. 09264321, dated Oct. 7, 1997.
Japanese Abstract No. 56–90115, dated Jul. 22, 1981.
Japanese Abstract No. 10274244, dated Oct. 13, 1998.
Japanese Abstract No. 09088986, dated Mar. 31, 1997.
Japanese Abstract No. 07127637, dated May 16, 1995.

* cited by examiner

Primary Examiner—Thomas R. Hannon
(74) Attorney, Agent, or Firm—Sughrue Mion, PLLC (57) ABSTRACT

An angular type ball bearing according to the present invention secures good property of lubricating a shaft to be supported by the ball bearing while reducing the manufacturing cost thereof, thereby being able not only to reduce the temperature rise of the bearing as well as the required rotation torque of the shaft to be supported but also to enhance the running accuracy of the shaft to be supported. The anti-load-side end portions of the outer rings 32 of the bearings 30 are respectively situated nearer to balls 37 arranged along the axial direction of a shaft to be supported by the bearings 30 than the load-side end portions of the inner rings 31 of the bearings 30. The width-direction dimensions of the outer rings 32 are formed smaller than the width-direction dimensions of the inner rings 31.

9 Claims, 11 Drawing Sheets

ANGULAR TYPE BALL BEARING AND SHAFT SUPPORT STRUCTURE WITH THE SAME

BACKGROUND OF THE INVENTION

The present invention relates to an angular type ball bearing which is used in a rotation support portion included in various machines and apparatus, especially in the spindle main shaft portion of a machine tool to support loads in radial and thrust directions and, in particular, to a structure for improving the lubricating performance of the spindle main shaft portion of the machine tool.

Further, the present invention also relates to a shaft support structure with the above-mentioned angular type ball bearing.

Figure 11:
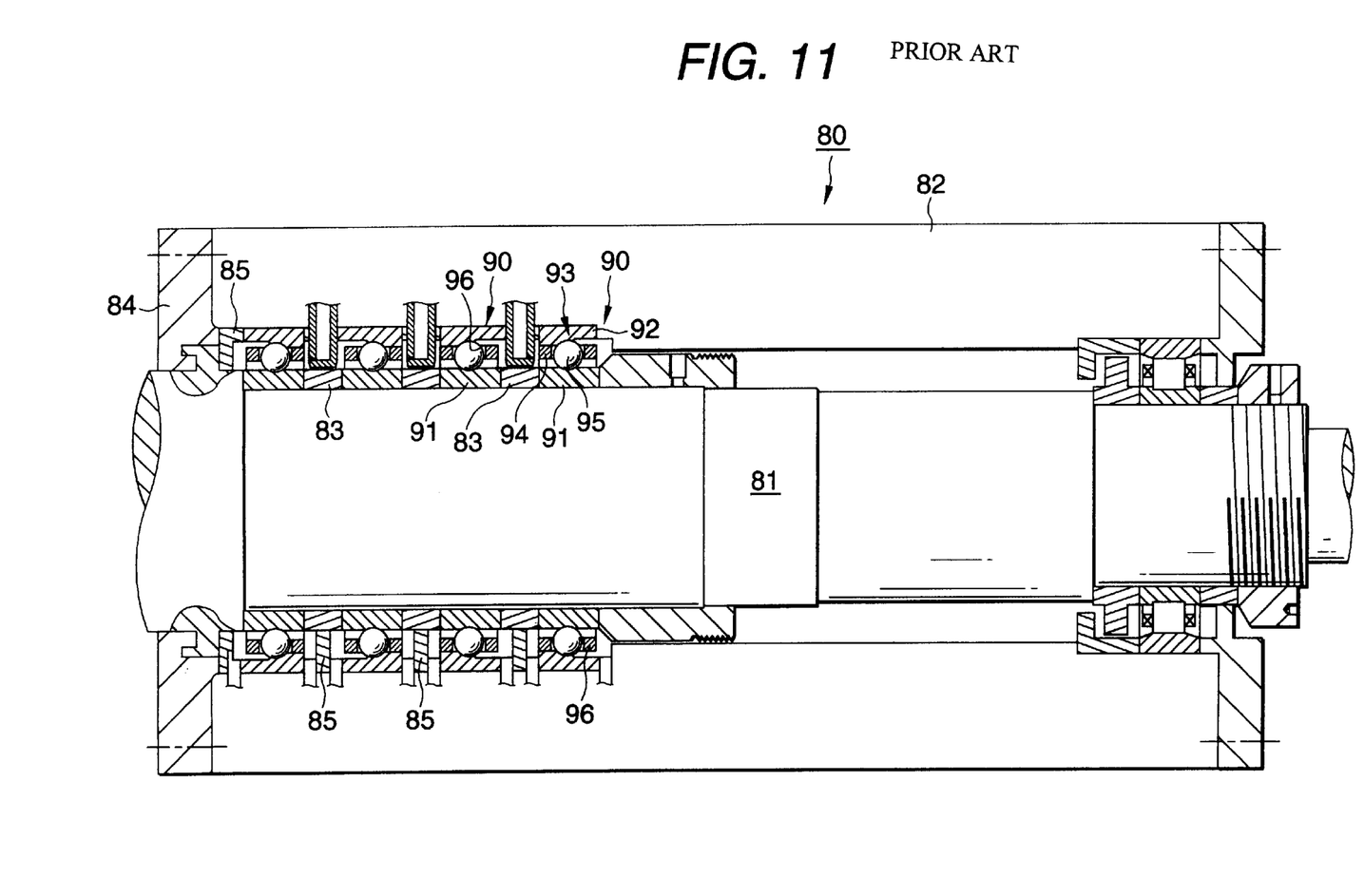

Referring here to FIG. 11, recently, as a shaft support structure 80 which is applied to the spindle main shaft portion of a machine tool, there is known a structure in which, between the outer peripheral surface of a main shaft 81 and the inner peripheral surface of a housing 82, there are arranged a plurality of angular type ball bearings 90 (which is hereinafter referred to as a bearing 90 simply) side by side along the axial direction of the main shaft 81.

Between the inner rings 91 of the respective bearings 90, there are interposed inner-ring-spacers 83 respectively. Also, between the outer rings 92 of the respective bearings 90 as well as between the outer ring 92 of the bearing 90 that is located in the end of the bearings 90 and a cover body fixed to the left end portion (in FIG. 11) of the housing 82, there are interposed outer-ring-spacers 85 respectively.

Each bearing 90 is structured such that a ball row 93 is rollably inserted together with a retainer 94 into a raceway formed between the inner ring 91 and outer ring 92 and, in the anti-load-side portion of the outer ring 92, there is formed a counter bore 96 for enhancing the oil discharge performance of the bearing 90 (more specifically, in the case of the two bearings 90 that are arranged on the left side in FIG. 11, in the portions thereof that are situated on the left-hand side of balls 95 in the ball rows 93, there are respectively formed counter bores 96; and, in the case of the two bearings 90 that are arranged on the right side in FIG. 11, in the portions thereof that are situated on the right-hand side of the balls 95, there are respectively formed counter bores 96). That is, due to provision of the counter bores 96, the oil discharge performance of the respective bearings 90 in discharging lubricating oil is enhanced to thereby be able to reduce the required rotation torque of the main shaft 81.

In the above-mentioned conventional shaft support structure 80, in order to improve the oil discharge performance of the respective bearings 90 as well as reduce the required rotation torque of the main shaft 81, there are formed the counter bores 96 in the anti-load side portions of the outer rings 92 of the respective bearings 90.

However, the counter bores 96 of the bearings 90 are respectively very small as the lubricating oil discharge spaces. For this reason, especially, to support the main shaft 81 of a machine tool, the oil discharge performance of the bearings 90 is insufficient, which makes it impossible to secure the proper lubricating performance of the bearings 90.

This raises a problem that a rise in the temperatures of the bearings and the required rotation torque of the shaft to be supported cannot be reduced. That is, failure to reduce a rise in the bearing temperature and the shaft required rotation torque makes it impossible to secure the high working precision of the machine tool.

Also, the cover body 84 is fixed to the left end portion (in FIG. 11) of the housing 82 through a bolt, and the outer rings 92 of the bearings 90 are respectively fixed in the thrust direction by the cover body 84 through their associated outer-ring-spacers 85.

However, when the tightening amount of the cover 84 to the housing 82 becomes excessively large, there is a fear that the outer rings 92 of the bearings 90 can be deformed. In case where the outer rings 92 of the bearings 90 are deformed, there arises a problem that the raceway surfaces of the outer rings 92 forming the raceways for the balls 95 can be deformed, thereby lowering the running accuracy of the main shaft 81.

On the other hand, when the tightening amount of the cover 84 to the housing 82 becomes excessively small, although there is reduced the fear that the outer rings 92 of the bearings 90 can be deformed, the creep and contact rigidity of the outer rings 92 are affected.

In view of the above, the tightening amount of the cover body 84 to the housing 82 is set in the range of 10–30 $\mu$m based on previous results. However, in fact, there cannot be avoided the deformation of the outer rings 92 of the bearings 90. Therefore, there is still left the problem that, due to the deformation of the raceway surfaces of the outer rings 92, the running accuracy of the main shaft 81 is degraded.

SUMMARY OF THE INVENTION

The present invention aims at eliminating the drawbacks found in the above-mentioned conventional angular type ball bearing.

Accordingly, it is an object of the invention to provide an angular type ball bearing which is simple in structure, can reduce the manufacturing cost thereof, and can secure the proper lubricating performance of a shaft to be supported thereby, whereby the bearing temperature rise reduction and the shaft required rotation torque reduction can be achieved as well as the running accuracy of the shaft to be supported thereby can be improved.

According to the invention, the above object can be attained by the following structures that are respectively set forth in the following first to fifth aspects of the invention.

In the first aspect of the invention, an angular type ball bearing structured such that a ball row is rollably inserted together with a retainer in a raceway formed between an inner ring and an outer ring, wherein the anti-load-side end portion of the outer ring is situated nearer to rolling bodies (balls) existing along the axial direction of a shaft to be supported by the bearing than the load-side end portion of the inner ring.

In a second aspect of the present invention, an angular type ball bearing structured such that a ball row is rollably inserted together with a retainer in a raceway formed between an inner ring and an outer ring, wherein the anti-load-side end portion of the outer ring is situated nearer to rolling bodies (balls) existing along the axial direction of a shaft to be supported by the bearing than the load-side end portion of the inner ring, and the anti-load-side end portion of the inner ring is situated nearer to the rolling bodies existing along the axial direction of the shaft to be supported by the bearing than the load-side end portion of the outer ring.

In a third aspect of the invention, a shaft support structure in which the angular type ball bearings set forth in the above first or second aspect are disposed in two or more rows side by side along the axial direction of a shaft to be supported by the ball bearings between the outer peripheral surface of the shaft to be supported and the inner peripheral surface of a housing, inner-ring-spacers are respectively interposed between the inner rings of the bearings in the respective rows, and outer-ring-spacers are respectively interposed between the outer rings of the bearings in the respective rows as well as between the outer ring of the endmost bearing and a cover body fixed to the end portion of the housing.

By the way, as the material of the inner-ring-spacers and outer-ring-spacers, preferably, material having high thermal conductivity may be used. This can enhance the thermal conductivity of the shaft support structure as a whole as well as can control a rise in the temperature of the angular type ball bearings in the respective rows down to a low level.

In a fourth aspect of the invention, a shaft support structure as set forth in the above third aspect, wherein oil discharge holes for discharging lubricating oil are formed at the given positions of the outer-ring-spacers in the vicinity of the rolling bodies.

In a fifth aspect of the invention, a shaft support structure as set forth in the above third or fourth aspect, wherein oil supply holes for supplying lubricating oil are formed at the given positions of the outer-ring-spacers in the vicinity of the anti-load-side end portions of the outer rings.

The angular type ball bearing as set forth in the first aspect is applied to the support portion of a rotary shaft included in various machines and apparatus and, especially, to the spindle main shaft portion of a machine tool. And, for example, from oil supply nozzles which are disposed in the vicinity of the anti-load-side end portion of the inner ring, there is supplied lubricating oil toward the inner ring and toward between the rolling bodies according to an oil/air lubricating system or an oil/mist lubricating system. The lubricating oil supplied forms films of oil in the contact portions between the inner and outer rings and rolling bodies to thereby lubricate the bearing.

In this lubrication, since the anti-load-side end portion of the outer ring is situated nearer to rolling bodies existing along the axial direction of a shaft to be supported by the bearing than the load-side end portion of the inner ring, there can be provided a large lubricating oil discharge space, so that the excessive lubricating oil in the interior portion of the bearing can be discharged with high efficiency. This makes it possible to reduce-not only a rise in the temperature of the bearing but also the required rotation torque of the shaft to be supported. Also, the outer ring is hard to be deformed and thus the lowered running accuracy of the shaft to be supported, which could be otherwise caused by the deformed outer ring, can be prevented.

According to the angular type ball bearing as set forth in the second aspect, since the anti-load-side end portion of the outer ring is situated nearer to the rolling bodies (balls) existing along the axial direction of a shaft to be supported by the bearing than the load-side end portion of the inner ring, there can be provided a large lubricating oil discharge space, so that the excessive lubricating oil in the interior portion of the bearing can be discharged with high efficiency. Also, because the anti-load-side en[0084] portio[008e] of the inne[00f8] rin is situated nearer to the rolling bodies existing along the axial direction of the shaft to be supported by the bearing than the load-side end portion of the outer ring, there can be reduced the influence of an air curtain, so that the lubricating oil can be supplied into the interior portion of the bearing with further higher efficiency. This makes it possible to reduce not only the temperature rise of the bearing but also the required rotation torque of the shaft to be supported. Also, the outer ring is hard to be deformed, which can prevent the lowered running accuracy of the shaft to be supported that could be otherwise caused by the deformed outer ring. In a shaft support structure as set forth in the third aspect, the angular type ball bearings as set forth in the first or second aspect are disposed in two or three rows side by side along the axial direction of a shaft to be supported by the ball bearings between the outer peripheral surface of the shaft to be supported and the inner peripheral surface of a housing. Between the inner rings of the ball bearings in the respective rows, there are interposed inner-ring-spacers respectively. Also, between the outer rings of the ball bearings in the respective rows as well as between the outer ring of the endmost bearing and a cover fixed to the end portion of the housing, there are interposed outer-ring-spacers respectively.

According to the present shaft support structure, for the angular type ball bearings in the respective rows, there is supplied lubricating oil toward the inner rings as well as toward between the rolling bodies from oil supply nozzles disposed between the ball bearings in the respective rows in the vicinity of the anti-load-side end portions of the inner rings according to an oil/air lubricating system or an oil/mist lubricating system. The lubricating oil supplied forms films of oil in the contact portions between the inner and outer rings and rolling bodies to thereby lubricate the ball bearings.

In this lubrication, in case where the anti-load-side end portions of the outer rings of the ball bearings in the respective rows are situated nearer to the rolling bodies existing in the axial direction of the shaft to be supported than the load-side end portions of the inner rings, or in case where the anti-load-side end portions of the inner rings of the ball bearings in the respective rows are situated nearer to the rolling bodies existing in the axial direction of the shaft to be supported than the load-side end portions of the outer rings, the influence of the air curtain can be reduced to thereby be able to supply the lubricating oil into the interior portions of the ball bearings with high efficiency, and also there is provided a large space for discharging the lubricating oil to thereby be able to discharge the excessive lubricating oil in the interior portions of the ball bearings with high efficiency. Therefore, the bearing temperature rise and the shaft required rotation torque can be reduced. Also, the outer rings are hard to-be deformed, which can prevent the lowered running accuracy of the shaft to be supported that could be otherwise caused by the deformed outer rings.

In a shaft support structure as set forth in the fourth aspect, in the respective outer-ring-spacers interposed between the outer rings of the angular type ball bearings in the respective rows as well as between the outer ring of the endmost bearing and a cover body fixed to the end portion of the housing, there are formed oil discharge holes respectively. That is, the oil discharge holes are respectively disposed at the given positions of their associated outer-ring-spacers in the vicinity of the rolling bodies to discharge the excessive lubricating oil in the interior portions of the ball bearings.

Therefore, there can be provided a further larger lubricating oil discharge space, which makes it possible to discharge the excessive lubricating oil in the interior portions of the ball bearings with very high efficiency. Thanks to this, the bearing temperature rise as well as the shaft required rotation torque can be reduced more positively.

In a shaft support structure as set forth in the fifth aspect, in the respective outer-ring-spacers interposed between the outer rings of the angular type ball bearings in the respective rows as well as between the outer ring of the endmost bearing and a cover body fixed to the end portion of the housing, there are formed oil supply holes respectively. That is, the oil supply holes are respectively disposed at the given positions of their associated outer-ring-spacers in the vicinity of the anti-load-side end portions of the outer rings to supply the lubricating oil into the interior portions of the ball bearings.

Therefore, there can be provided a bearing having a pseudo outer ring oil supply system and thus, when compared with a bearing having a conventional outer ring oil supply system in which an oil supply hole is formed directly in the outer ring of the bearing, not only there can be obtained an equivalent effect but also the manufacturing cost of the bearing can be reduced.

Further, the above-mentioned object can also be achieved by a shaft support structure, according to the present invention, comprising:

a plurality of angular type ball bearings which supports a shaft and are aligned in an axial direction of the shaft, wherein each of the bearings comprising:
an inner ring;
an outer ring;
a ball row defined by a plurality of balls, each of the balls rollably inserted into a raceway formed between the inner and outer rings; and
a retainer disposed between the inner and outer rings and rollably retaining the balls therebetween,
wherein the anti-load-side end portion of the outer ring is situated nearer to the ball row than the load-side end portion of the inner ring in an axial direction of the ball bearing.

In the shaft support structure, it is preferable that a width of the outer ring is larger than a width of the inner ring in the axial direction of the ball bearing.

In addition, in the shaft support structure, it is preferable that the anti-load-side end portion of the inner ring is situated nearer to the ball row than the load-side end portion of the outer ring in the axial direction of the ball bearing.

Further, in the shaft support structure, it is preferable to further comprises:

at least one inner-ring-spacer interposed between the adjacent inner rings; and
at least one outer-ring-spacer interposed between the adjacent outer rings.

Furthermore, in the shaft support structure, it is advantageous to further comprises:

a housing rotatively accommodating the shaft;
a cover fixed to the end portion of the housing in the axial direction of the shaft;
an additional outer-ring-spacer interposed between the endmost outer ring in the axial direction and the cover.

Moreover, in the above-mentioned shaft support structure according to the present invention, it is also advantageous that the inner-ring-spacer and the outer-ring-spacer are made of a material having high thermal conductivity.

Furthermore, in the above-mentioned shaft support structure, it is preferable that atleast one oil discharge hole for discharging lubricating oil is formed at a given position of the outer-ring-spacer in the vicinity of the ball.

In addition, in the above-mentioned shaft support structure, it is preferable that at least one oil supply hole for supplying lubricatin oi[008c] is forme[0084] a[009f] give[008e] positio[008e] of th[0085] outer-ring-spacer in the vicinity of the anti-load-side end portion of the outer ring.

Further, in the above-mentioned shaft support structure, it is more preferable that a plurality of oil supply hole are formed at given positions of the outer-ring-spacer in the vicinity of the anti-load-side end portion of the outer ring and are aligned at a predetermined interval in a peripheral direction of the bearing.

DETAILED DESCRIPTION OF THE PREFERRED EMBODIMENTS

Now, description will be given below of the invention using the following embodiments illustrated herein.

Figure 1:
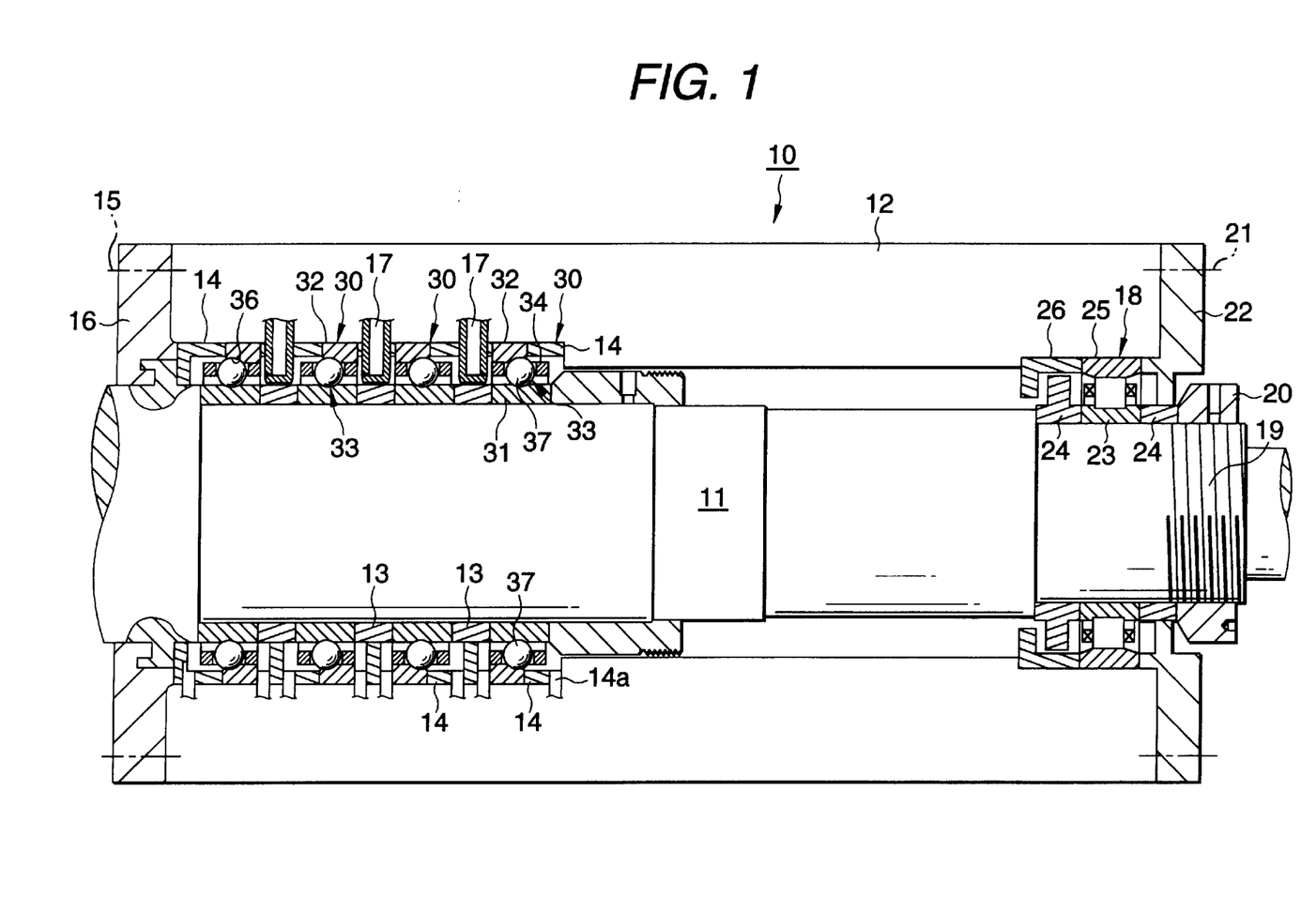
FIG. 1 is a section view of a shaft support structure to which an angular type ball bearing according to a first embodiment of the invention is applied.
Figure 2:
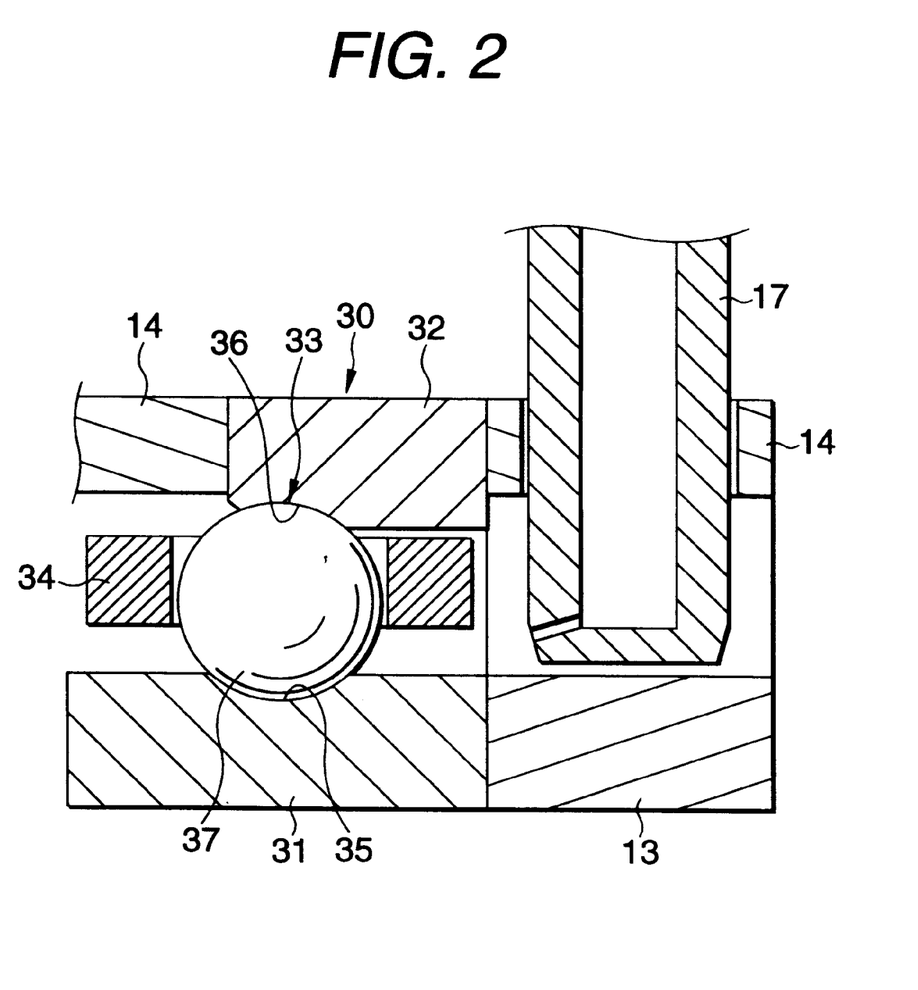
FIG. 2 is an enlarged section view of the main portions of the angular type ball bearing shown in FIG. 1.

FIG. 1 is a section view of a shaft support structure to which an angular type ball bearing according to a first embodiment of the invention is applied, and FIG. 2 is an enlarged section view of the main portions of the angular type ball bearing shown in FIG. 1.

Referring to FIGS. 1 and 2, in a shaft support structure 10 for supporting a main shaft 11 of a machine tool, between the left side (in FIG. 1) outer peripheral surface of the main shaft 11 and the inner peripheral surface of a housing 12, there are interposed angular type ball bearings 30 (which are hereinafter referred to as bearings 30 simply) along the axial direction (in FIG. 1, the right and left direction) of the main shaft 11 in two or more rows (in FIG. 1, one group of two rows of bearings 30 are disposed opposed to the other group of two rows of bearings 30 in such a manner that their back surfaces face each other, that is, a total of four rows of bearings 30 in a (DBB combination) arrangement).

Between the inner rings 31 of the respective rows of bearings 30, there are interposed inner-ring-spacers 13 respectively. Also, between the outer rings 32 of the respective rows of bearings 30 as well as between the outer ring 32 of the bearing 30 located in the-axial-direction end portion (in FIG. 1, in the left end portion) of the main shaft 11 and a cover body 16 fixed to the left (in FIG. 1) end portion of the housing 12 by a bolt 15, there are interposed outer-ring-spacers 14 respectively. Between the respective rows of bearings 30, there are respectively interposed oil supply nozzles 17 for supply of lubricating oil in such a manner that they are situated in the vicinity of the anti-load-side end portions of the inner rings 31 of the bearings 30.

Each of the bearings 30 is structured such that, into a raceway formed between the substantially cylindrical-shaped inner and outer rings 31 and 32, there is rollably inserted a ball row 33 together with a retainer 34.

On the outer peripheral surface of the inner ring 31, there is formed a raceway groove 35 in such a manner that it has a ring-like shape extending along the peripheral direction of the outer peripheral surface of the inner ring 31 and also has a substantially semicircular-shaped cross section.

While the inner ring 31 is inserted inwardly of the outer ring 32, the outer ring 32 is mounted on the outer periphery of the inner ring 31. The outer ring 32 includes a raceway groove 36 which corresponds to the raceway groove 35 of the inner ring 31. The raceway groove 36 is formed as a ring-like shape extending along the peripheral direction of the inner peripheral surface of the outer ring 32 and also has a substantially semicircular-shaped cross section which is formed so as to be opposed to the raceway groove 35 of the inner ring 31.

Between the inner and outer rings 31 and 32, there is formed a raceway which is defined by the raceway grooves 35 and 36 of the inner and outer rings 31 and 32. Into the thus formed raceway, there are rollably inserted a plurality of balls (rolling bodies) 37 belonging to the ball row 33 and, at the same time, into this raceway, there is incorporated the retainer 34 together with the ball row 33.

The anti-load-side end portions (in FIG. 2, the left end side portions) of the outer rings 32 of the bearings 30 are respectively situated nearer to the balls 37 arranged along the axial direction of the main shaft 11 (that is, nearer to the centers of the bearings 30 in the axial direction thereof; in FIG. 2, nearer to the right side) than the load-side end portions (in FIG. 2, the left end portions) of the inner rings 31 of the bearings 30.

That is, in the outer rings 32 of the bearings 30 according to the present embodiment, the portions thereof that correspond to the counter bores 96 of the conventional bearings 90 shown in FIG. 11 are cut away along the vertical direction in FIG. 2; and, thus, the width-direction (in FIG. 2, the right and left direction) dimensions of the outer rings 32 are formed smaller than the width-direction dimensions of the inner rings 31. And, each of the outer-ring-spacers 14, which extends up to the above cut-away portion, is formed so as to have a thickness (in FIG. 1, the vertical-direction dimension thereof) that is smaller than the thickness of the counter bore 96 formed in the conventional bearings 90 shown in FIG. 11.

Also, in each of the outer-ring-spacers 14, along and on the outside of a virtual line dropped down in FIG. 1 from the vicinity of the width-direction end portion of the bearing inner ring 31 (that is, on the opposite side of the balls 37), there is formed an oil discharge hole 14a. The oil discharge holes 14a are respectively used to discharge excessive lubricating oil present in the interior portions of the bearings 30.

As the material of the inner-ring-spacers 13 and outer-ring-spacers 14, there is used the material that has high thermal conductivity Use of such material not only can enhance the thermal conductivity of the shaft support structure 10 as a whole but also can control the temperature rise of the respective rows of bearings 30 down to a low level.

On the other hand, between the right-side (in FIG. 1) outer peripheral surface of the main shaft 11 and the inner peripheral surface of the housing 12, there is interposed a cylindrical roller bearing 18. On the outer peripheral surface of the right (in FIG. 1) end portion of the main shaft 11, there is formed a male screw portion 19, while a bearing nut 20 is to be threadedly engaged with the male screw portion 19.

Referring in more detail to the structure of the cylindrical roller bearing 18, an inner ring 23 thereof is held between inner-ring-spacers 24 by the bearing nut 20 threadedly engaged with the male screw portion 19 of the main shaft 11, while an outer ring 25 thereof is held between an outer-ring-spacer 26 and a cover member 22 fixed by a bolt 21 to the right (in FIG. 1) end portion of the housing 25.

Now, description will be given below of the operation of the present embodiment.

In the shaft support structure 10, in more specifically, in each of the bearings 30 included in the respective rows, the lubricating oil is supplied toward the raceway groove 35 of the inner ring 31 from the oil supply nozzle 17 disposed adjacently to the anti-load-side end portion of the inner ring 31 according to an oil-air lubricating system or an oil-mist lubricating system. The thus supplied lubricating oil forms films of oil in the contact portions between the balls 37 and the raceway grooves 35, 36 of the inner and outer rings 31 and 32 of the bearing 30 to thereby be able to lubricate the bearing 30.

In this lubrication, since the anti-load-side end portion of the outer ring 32 of the bearing 30 is situated nearer to the balls 37 existing along the axial direction of the main shaft 11 than the load-side end portion of the inner ring 31, there can be provided a large lubricating oil discharge space, so that the excessive lubricating oil in the interior portion of the bearing 30 can be discharged with high efficiency. Due to this, both of the temperature rise of the bearing 30 and the required rotation torque to the main shaft 11 can be reduced.

Also, the width-direction dimension of the outer ring 32 of the bearing 30 is set small when compared with, for example, the conventional bearing 90 shown in FIG. 11. Thanks to this, even when the tightening torque of the cover body 16 by the bolt 15 is excessively large and thus an unreasonable tightening force is applied to the outer ring 32 through the outer-ring-spacers 14, the raceway groove 36 of the outer ring 32 is hard to be deformed. This can prevent the possibility that the running accuracy of the main shaft 11 can be lowered due to the deformation of the raceway 36 of the outer ring 32.

Figure 3:
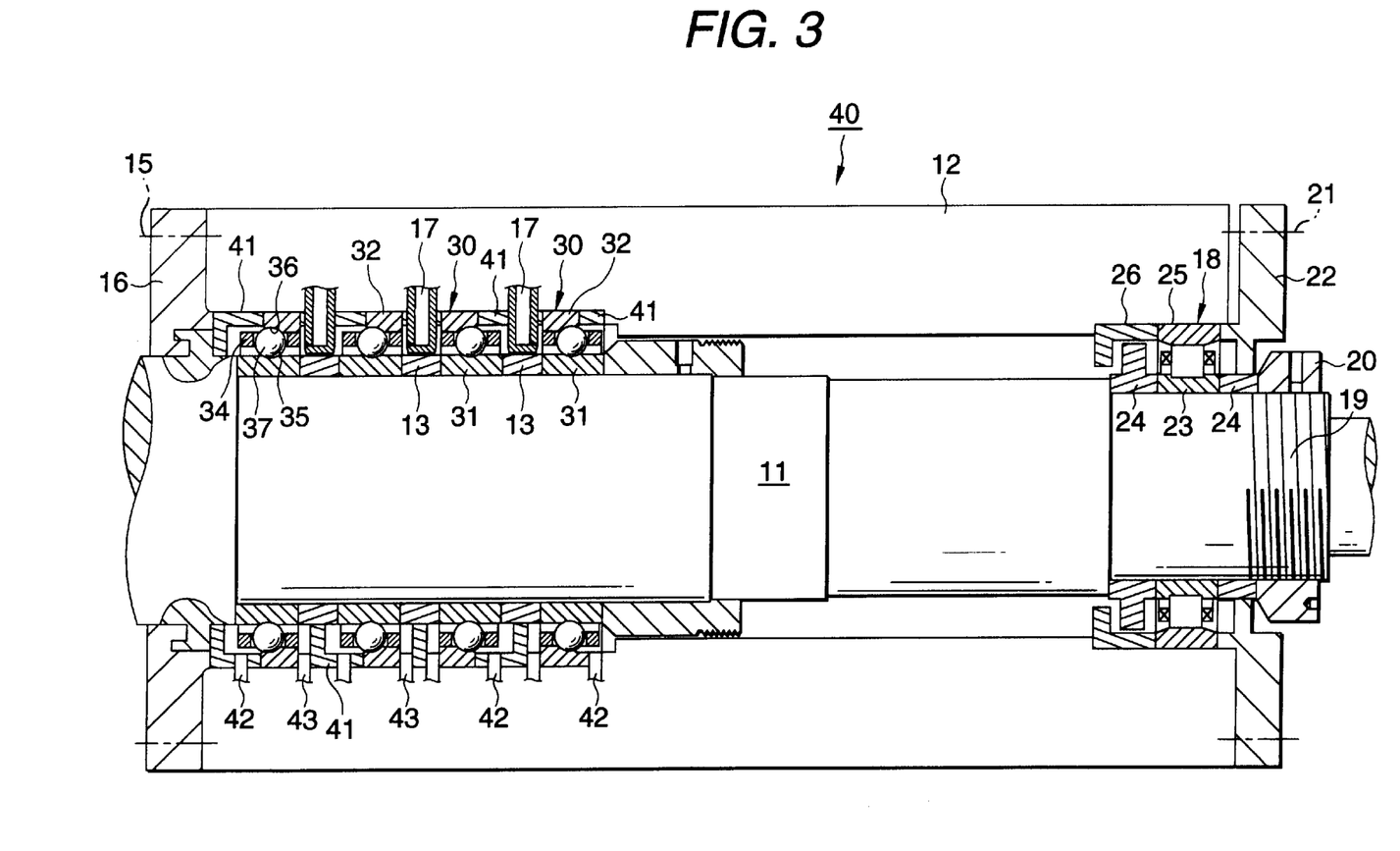
FIG. 3 is a section view of a shaft support structure to which an angular type ball bearing according to a second embodiment of the invention is applied.

Now, FIG. 3 is a section view of a shaft support structure to which an angular type ball bearing according to a second embodiment of the invention is applied.

In a shaft support structure 40 according to the present embodiment, of oil discharge holes 42 and 43 respectively formed in outer-ring-spacers 41, the oil discharge holes 42 formed in the vicinity of the anti-load side end portions of the outer rings 32 are respectively positioned inside of virtual lines dropped down in FIG. 3 from the vicinity of the width-direction end portions of the inner rings 31 (that is, the present oil discharge holes 42 are positioned nearer to the balls 37). This positioning of the oil discharge holes 42 can enhance oil discharge efficiency with which the lubricating oil is discharged from the interior portions of the bearings 30 by the present oil discharge holes 42.

The remaining portions of the structure and operation of the second embodiment are similar to those of the previously described first embodiment.

Figure 4:
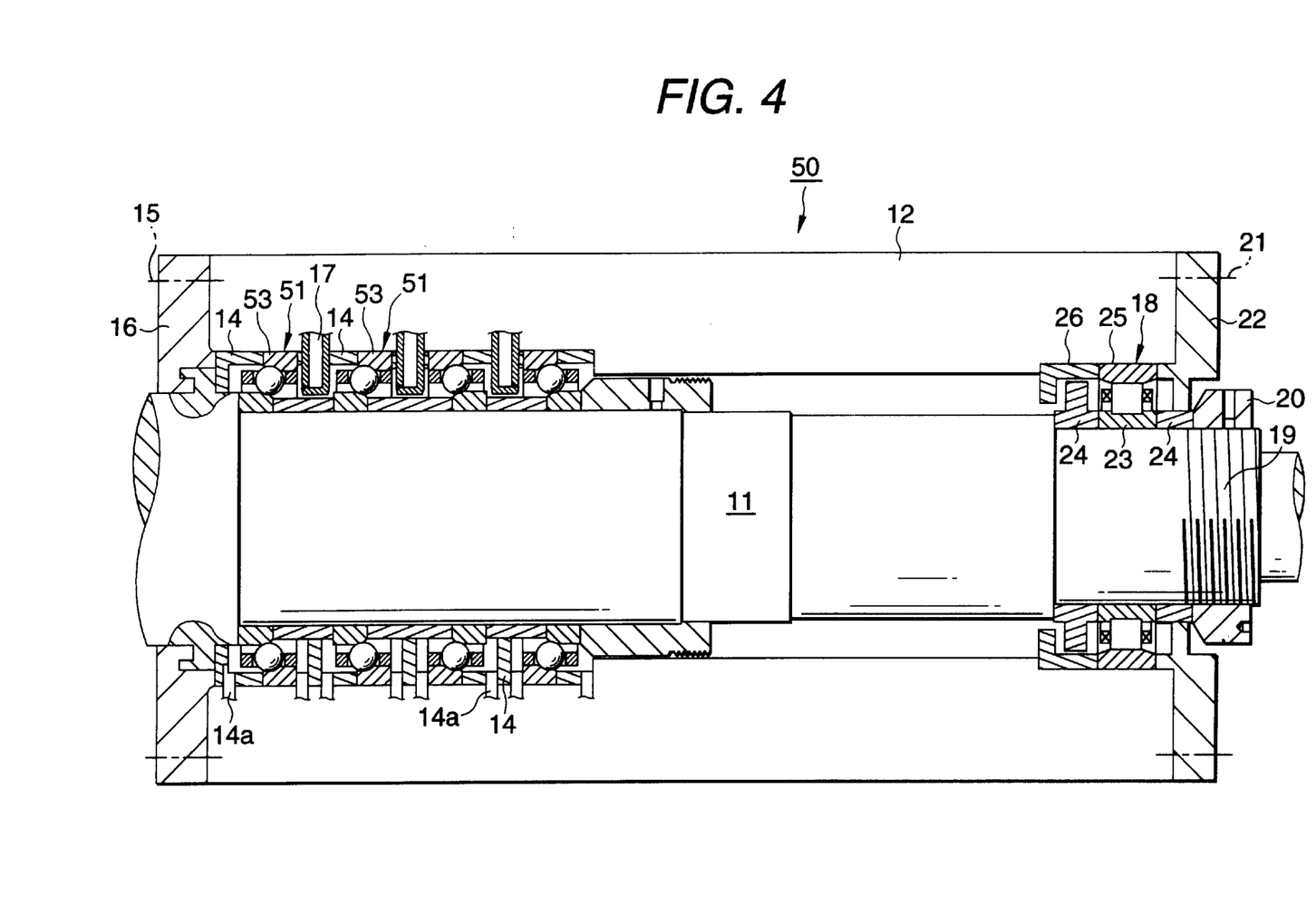
FIG. 4 is a section view of a shaft support structure to which an angular type ball bearing according to a third embodiment of the invention is applied.

Now, FIG. 4 is a section view of a shaft support structure to which an angular type ball bearing according to a third embodiment of the invention is applied.

In a shaft support structure 50 according to the present embodiment, not only the anti-load side end portions of outer rings 53 of bearings 51 are positioned nearer to the balls 37 arranged along the axial direction of the main shaft 11 than the load side end portions of inner rings 52 of the bearings 51, but also the anti-load side end portions (in the two left-side rows of bearings 51 shown in FIG. 4, the right end portions) of the inner rings 52 are positioned nearer to the balls 37 arranged along the axial direction of the main shaft 11 (in the two left-side rows of bearings 51 shown in FIG. 4, nearer to the left side thereof) than the load side end portions (in the two left-side rows of bearings 51 shown in FIG. 4, the right end portions) of the outer rings 53. Also, the thicknesses (in FIG. 4, the vertical-direction dimensions) of the inner-ring-spacers 54 are set smaller than the thicknesses of the inner rings 52.

Thanks to this structure, since the oil supply nozzles 17 can be disposed further inwardly in the radial direction of the bearings, when the lubricating oil is supplied into the interior portions of the bearings 51 using the oil supply nozzles 17, the influences of air curtains can be reduced, thereby being able to enhance the supply efficiency of the lubricating oil further.

The remaining portions of the structure and operation of the third embodiment are similar to those of the previously described first embodiment.

Figure 5:
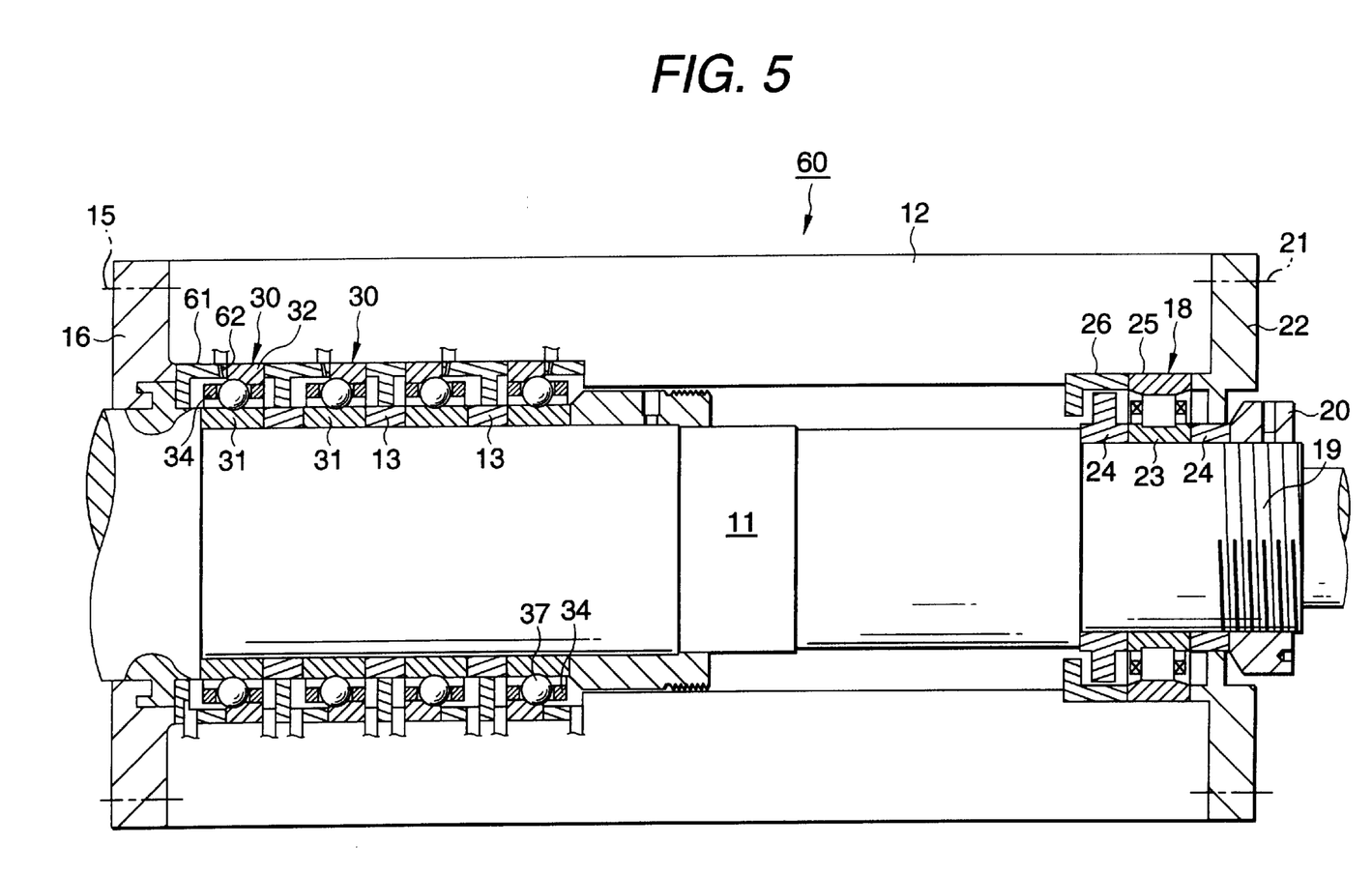
FIG. 5 is a section view of a shaft support structure to which an angular type ball bearing according to a fourth embodiment of the invention is applied.

Now, FIG. 5 is a section view of a shaft support structure to which an angular type ball bearing according to a fourth embodiment of the invention is applied.

In a shaft support structure 60 according to the present embodiment, the oil supply nozzles are not disposed between the bearings 30 in the respective rows but, between outer-ring-spacers 61, there are formed oil supply nozzle holes 62 respectively. The oil supply nozzle holes 62 are formed so as to communicate with an oil supply passage (not shown) formed in the housing 12. And, the oil supply passage is connected to a lubricating fluid supply source (not shown) which supplies oil/air or oil/mist.

That is, by setting the oil supply nozzle holes 62 at given positions of the respective outer-ring-spacers 61 in the vicinity of the anti-load side end portions of the outer rings 32, the lubricating oil supply system can be formed as a pseudo outer ring oil supply system.

Therefore, when compared with the conventional outer ring oil supply system in which the oil supply holes are formed directly in the outer rings of the bearings, the present shaft support structure 60, while it can provide an equivalent effect, that is, it is free from the influences of air curtains, can provide high oil supply efficiency and can be worked easily to thereby be able to reduce the manufacturing cost thereof.

The remaining portions of the structure and operation of the fourth embodiment are similar to those of the previously described first embodiment.

Figure 6:
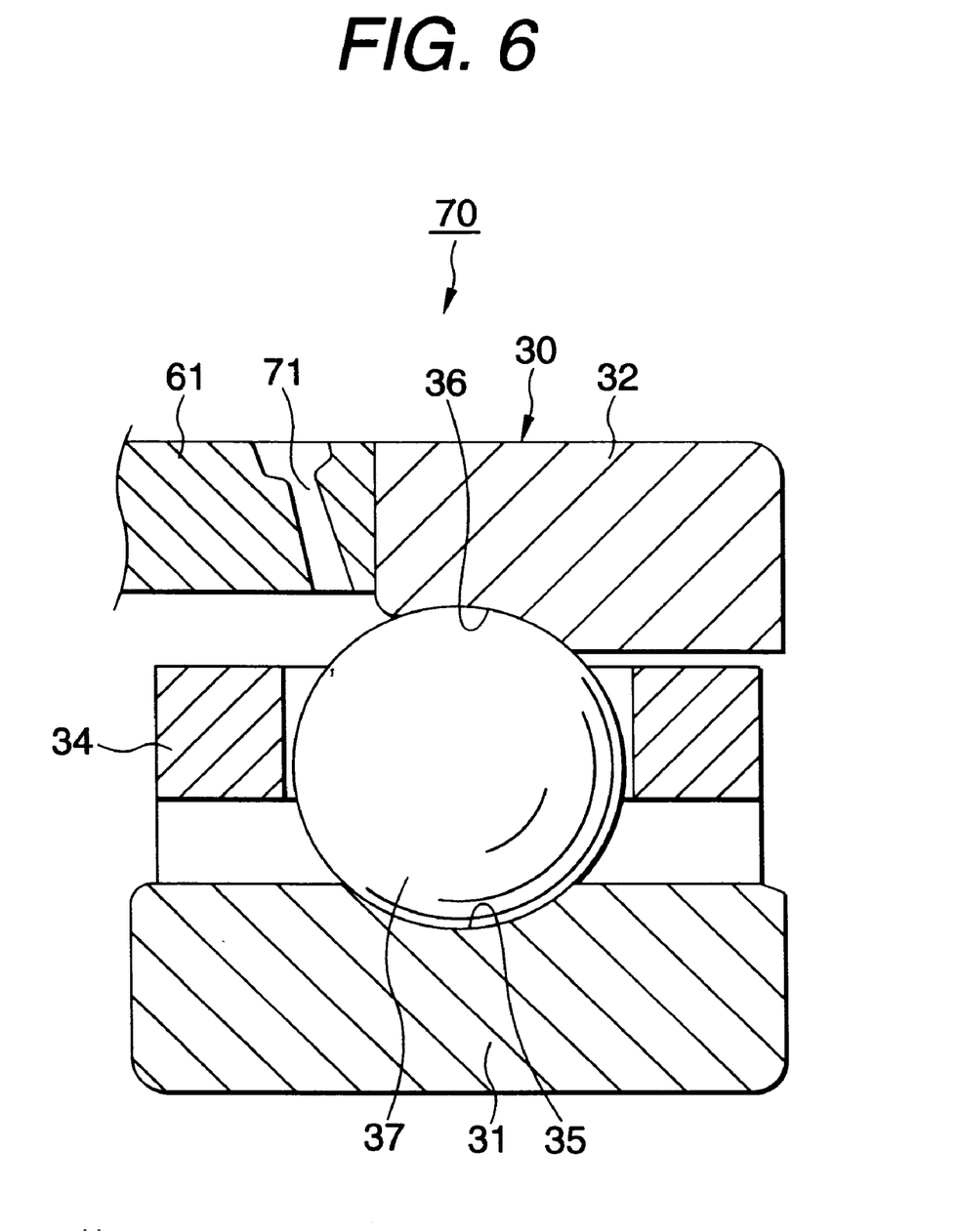
FIG. 6 is a section view of the main portions of an angular type ball bearing according to a fifth embodiment of the invention.

Now, FIG. 6 is a section view of the main portions of an angular type ball bearing according to a fifth embodiment of the invention.

In a shaft support structure 70 according to the present embodiment, as an oil supply nozzle hole 71, there is used a Laval nozzle which is opened toward balls 37.

Normally, in a machine tool, an oil air device is used at an air supply pressure=$3.4 \times 10^{-1}$–$4.4 \times 10^{-1}$ MPa {3.5–4.5 kgf/cm$^2$ (gauge pressure).

In the present embodiment, in case where an ideal nozzle shape is calculated under the conditions that an air supply y pressure =0.39 MPa (4 kgf/cm$^2$), an air flow amount=25 Nl/min, and a tiny particle of oil amount, that is, a lubricating oil supply amount=$0.03 \times 10^{-3}$ l/min (0.03 cc/8 min) (most of a supply pipe is occupied by the air), there can be found the section area of the throat portion=approx. 0.434 mm$^2$ (diameter=approx. 0.74 mm), and the section area of the opening end=approx. 0.577 mm$^2$ (diameter=approx. 0.86 mm). However, while the adiabatic flow and friction loss are not taken into account, the present calculation was made assuming that the entrance flow speed=0 m/s, the entrance area=∞, and the external pressure=0.1012 MPa (1.033 kgf/cm$^2$).

In the above-shaped oil supply nozzle 71, the throat portion air flow speed=the speed of sound (approx. 313 m/s) and the air injection speed=approx. 463 m/s.

By using the thus formed oil supply nozzle holes 71 as the fine amount lubricating devices of the bearings, the lubricating oil can be supplied to the bearings 30 positively and highly efficiently. Therefore, the supply amount of the lubricating oil to the bearings 30 can be decreased.

Also, by making use of the air that is jetted out from the nozzle opening ends while it is accelerated and cooled, the cooling action of the bearings 30 can be reinforced.

The remaining portions of the structure and operation of the fifth embodiment are similar to those of the previously described fourth embodiment.

Figure 7:
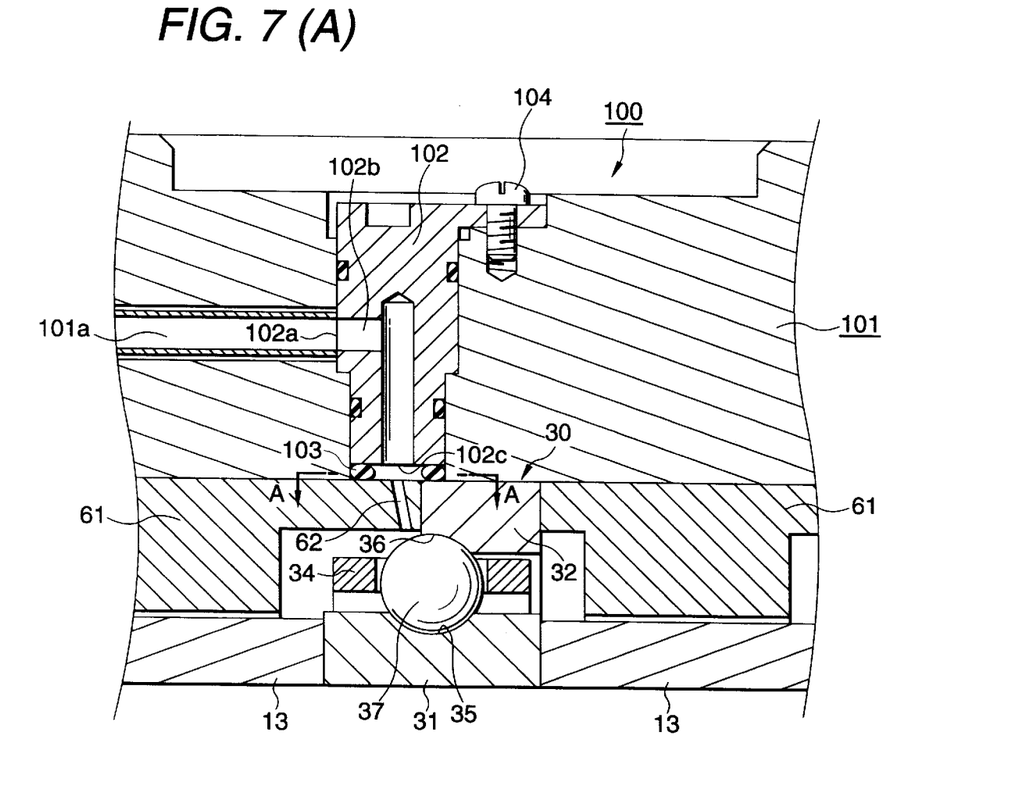
FIGS. 7(A) and 7(B) are section views of the main portions of an angular type ball bearing according to a sixth embodiment of the invention.

Now, FIG. 7(A) is a section view of the main portions of a shaft support structure 100 to which an angular type bearing according to a sixth embodiment of the invention is applied.

In the shaft support structure 100 according to the present embodiment, a nozzle frame 102, which is used to connect together an oil supply passage 101a formed in a housing 101 and an oil supply nozzle hole 62 formed in an outer-ring-spacer 61, is disposed within the housing 101; and, into the connecting portion between the nozzle frame 102 and oil supply nozzle hole 62, there is inserted an O ring 103.

The oil supply passage 101a is formed in such a manner that, with the end portion thereof connected to a lubricating fluid supply source (not shown), it extends in the axial direction (in FIG. 7(A), in the right and left direction) of the housing 101. The nozzle frame 102 is fixed to the housing 101 by a bolt 104. The nozzle frame 102 includes a side portion opening 102a in communication with the oil supply passage 101a, an oil supply passage 102b for guiding lubricating oil flowed therein from the side portion opening 102a to the bottom portion of the nozzle frame 102, and a bottom portion opening 102c for supplying lubricating oil, The bottom portion opening 102c and O ring 103 are respectively disposed on the inner peripheral surface side of the housing 101. Referring further to the oil supply nozzle hole 62, three oil supply nozzle holes 62 are disposed in the peripheral portion of each bearing 30 at regular intervals.

Now, FIG. 7(B) is a section view taken along the arrow line A—A shown in FIG. 7(A). The oil supply nozzle holes 62 are formed in the vicinity of the contact surface of the outer-ring-spacer 61 with respect to the anti-load side portion of the outer ring 32. And, each of the oil supply nozzle holes 62 has a substantially circular-shaped cross section.

In the above-structured shaft support structure 100, insertion of the O ring 103 in the communicating portion between the bottom opening 102c of the nozzle frame 102 for supplying lubricating oil and the oil supply nozzle hole 62 of the outer-ring-spacer 62 can enhance the sealing property of the communicating portion, which makes it possible to improve the supply efficiency of the lubricating oil to the bearing 30.

By the way, in the present embodiment, the three oil supply nozzle holes 62 are disposed in the peripheral portion of each bearing 30 at regular intervals. However, the number of the oil supply nozzle holes 62 to be formed in each bearing is not limited to three but, in fact, for each bearing 30, there may be formed one or more oil supply nozzle hole 62. Also, the diameter of the oil supply nozzle hole 62 may preferably be set in the range of 0.5 mm–1.5 mm, and the oil supply nozzle holes 62 may be disposed in such a manner that it has an inclination angle of 60–90° with respect to the axial direction (in FIG. 7(A), in the right and left direction) of the housing 101.

Further, in order to be able to enhance the lubricating performance of the guide surface of a retainer 34, there may be formed an oil supply nozzle hole in the anti-load side portion of the outer ring 32 as well.

Still further, the present embodiment can also be applied to the communicating portion between the oil supply nozzle hole and the inner peripheral surface of a housing in which no nozzle frame is disposed as in the above-mentioned fourth embodiment.

The remaining portions of the structure and operation of the sixth embodiment are similar to those of the above-mentioned fourth embodiment.

Figure 8:
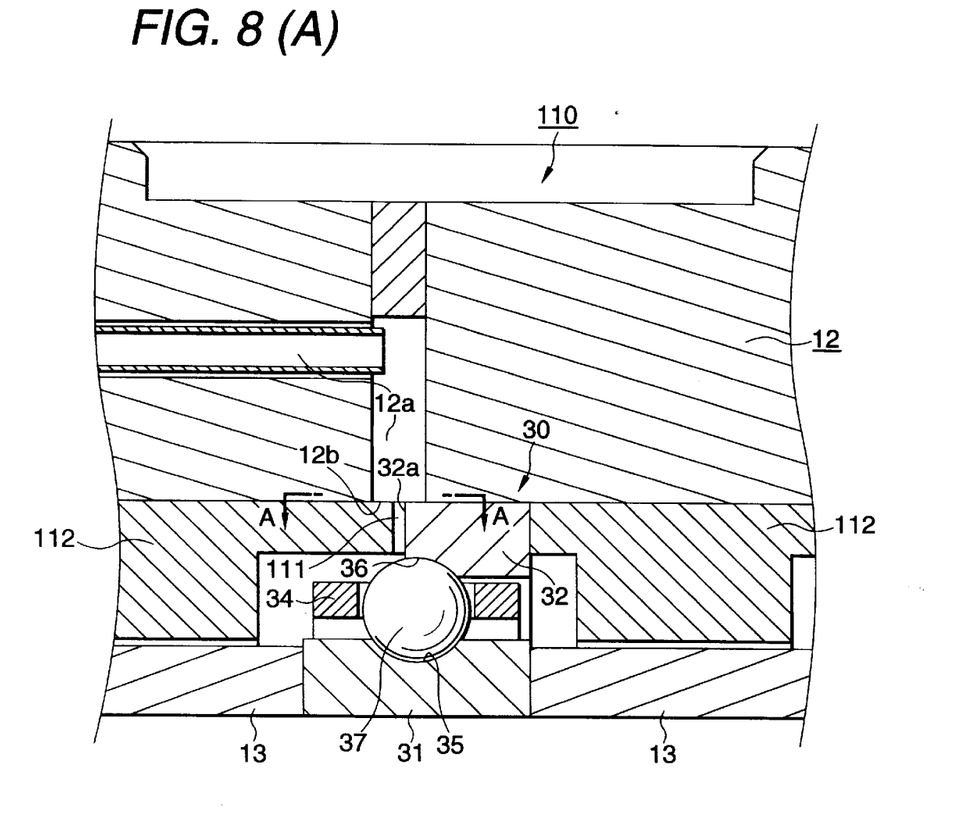
FIGS. 8(A) and 8(B) are section views of the main portions of an angular type ball bearing according to a seventh embodiment of the invention.

Now, FIG. 8(A) is a section view of the main portions of a shaft support structure 110 to which an angular type bearing according to a seventh embodiment of the invention is applied.

In the shaft support structure 110 according to the present embodiment, in the end face of an outer-ring-spacer 112 in contact with the anti-load side end portion 32a of the outer ring 32, there is formed an oil supply nozzle hole 111 in such a manner that it penetrates through the outer-ring-spacer 112 end face in the radial direction of a shaft to be supported. Specifically, three oil supply nozzle holes 111 are disposed in each bearing 30 in the peripheral direction thereof at regular intervals.

Within a housing 12, there is formed an oil supply passage 12a which is connected to a lubricating fluid supply source (not shown) and includes an opening 12b formed in the inner peripheral surface of the housing for supplying lubricating oil. The three oil supply nozzle holes 111 respectively communicate with the opening 12b of the oil supply passage 12a. The lubricating oil, which is supplied through the opening 12b of the oil supply passage 12a from the lubricating fluid supply source, is supplied to the bearing 30 through the oil supply nozzle holes 111.

Now, FIG. 8(B) is a section view taken along the arrow line A—A shown in FIG. 8(A). The section shape of the oil supply nozzle hole 111 formed in the outer-ring-spacer 112 is formed rectangular.

In the above-structured shaft support structure 110, formation of the oil supply nozzle hole 111 in the outer-ring-spacer 112 can facilitate the working of the oil supply nozzle hole 111, so that the manufacturing cost of the shaft support structure 110 can be reduced.

Also, the oil supply nozzle hole can also be formed in a triangular shape or in a substantially semicircular shape.

As described before, normally, in a machine tool, an oil air lubricating device is used under the condition that the air supply pressure is approx. 0.4 MPa and the air flow amount is approx. 25 Nl/min, for one air pipe. In that case, the oil supply nozzle hole diameter is of the order of 1 mm. When the section area of the oil supply nozzle hole is excessively small, the flow amount of the air is reduced, which makes it hard for the lubricating oil to flow within the lubricating pipe. On the other hand, in case where the section area of the oil supply nozzle hole is excessively large, the momentum of the lubricating oil jetted out from the oil supply nozzle hole is reduced, thereby making it hard for the lubricating oil to flow into the interior portion of the bearing.

In the present embodiment, the section area of the oil supply nozzle hole 111 can be set in the range of 0.3 mm$^2$–1.75 mm$^2$. Also, the three oil supply nozzle holes 111 are disposed in the peripheral portion of each bearing 30 at regular intervals. However, the number of the oil supply nozzle holes 111 to be formed in each bearing 30 is not limited to three but, in fact, in each bearing, there may be formed one or more oil supply nozzle holes 62.

Further, in order to be able to enhance the lubricating performance of the guide surface of a retainer 34, there may also be formed an oil supply nozzle hole in the anti-load side portion of the outer ring 32 as well.

The remaining portions of the structure and operation of the seventh embodiment are similar to those of the above-mentioned fourth embodiment.

Figure 9:
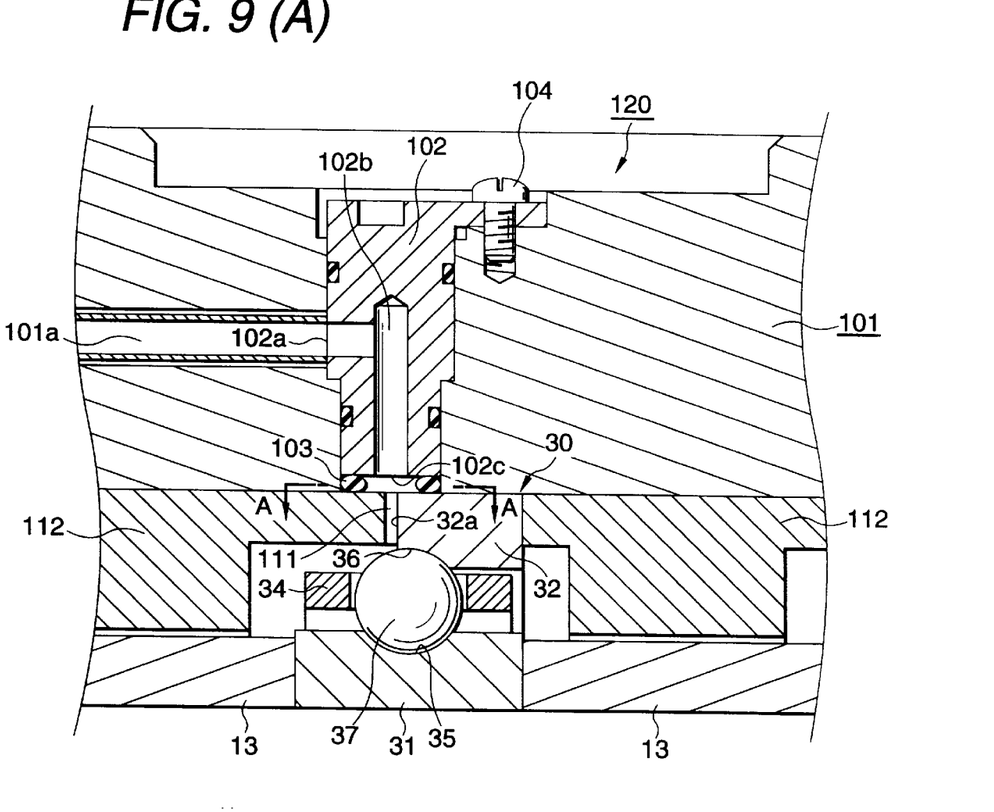
FIGS. 9(A) and 9(B) are section views of the main portions of an angular type ball bearing according to an eighth embodiment of the invention.

Now, FIG. 9(A) is a section view of the main portions of a shaft support structure 120 to which an angular type bearing according to an eighth embodiment of the invention is applied.

In the shaft support structure 120 according to the present embodiment, a nozzle frame 102, which is used to connect together an oil supply passage 101a formed in a housing 101 and an oil supply nozzle hole 111 formed in an outer-ring-spacer 112, is disposed within the housing 101; and, into the connecting portion between the nozzle frame 102 and oil supply nozzle hole 111, there is inserted an O ring 103. Further, the oil supply nozzle hole 111 is formed in the end face of the outer-ring-spacer 112 in contact with the anti-load side end portion 32a of an outer ring 32 in such a manner that it penetrates through the outer-ring-spacer 112 end face in the radial direction of a shaft 110 to be supported. In the present embodiment, specifically, three oil supply nozzle holes 111 are disposed in each bearing 30 at regular intervals in the peripheral direction thereof.

And, FIG. 9(B) is a section view of the present shaft support structure 120, taken along the arrow line A—A shown in FIG. 9(A). The shape of the cross section of each of the oil supply nozzle holes 111 formed in the end face of the outer-ring-spacer 112 is rectangular.

In the above-structured shaft support structure 120, since the oil supply nozzle holes 111 can be worked easily, the manufacturing cost of the shaft support structure 120 can be reduced. Also, each oil supply nozzle hole 111 can also be formed in a triangular shape or in an substantially circular shape. Further, insertion of the O ring 103 into the communicating portion between the bottom portion opening 102c of the nozzle frame 102 for supplying the lubricating oil and the oil supply nozzle hole 111 of the bearing 30 can enhance the sealing property of the communicating portion, which makes it possible to enhance the supply efficiency of the lubricating oil to the bearing 30.

By the way, in the present embodiment, three oil supply nozzle holes 111 are disposed in the peripheral portion of each bearing 30 at regular intervals. However, the number of the oil supply nozzle holes 111 to be formed in each bearing 30 is not limited to three but, in fact, in each bearing, there may be formed one or more oil supply nozzle holes 62.

The remaining portions of the structure and operation of the eighth embodiment are similar to those of the previously described fourth embodiment.

Figure 10:
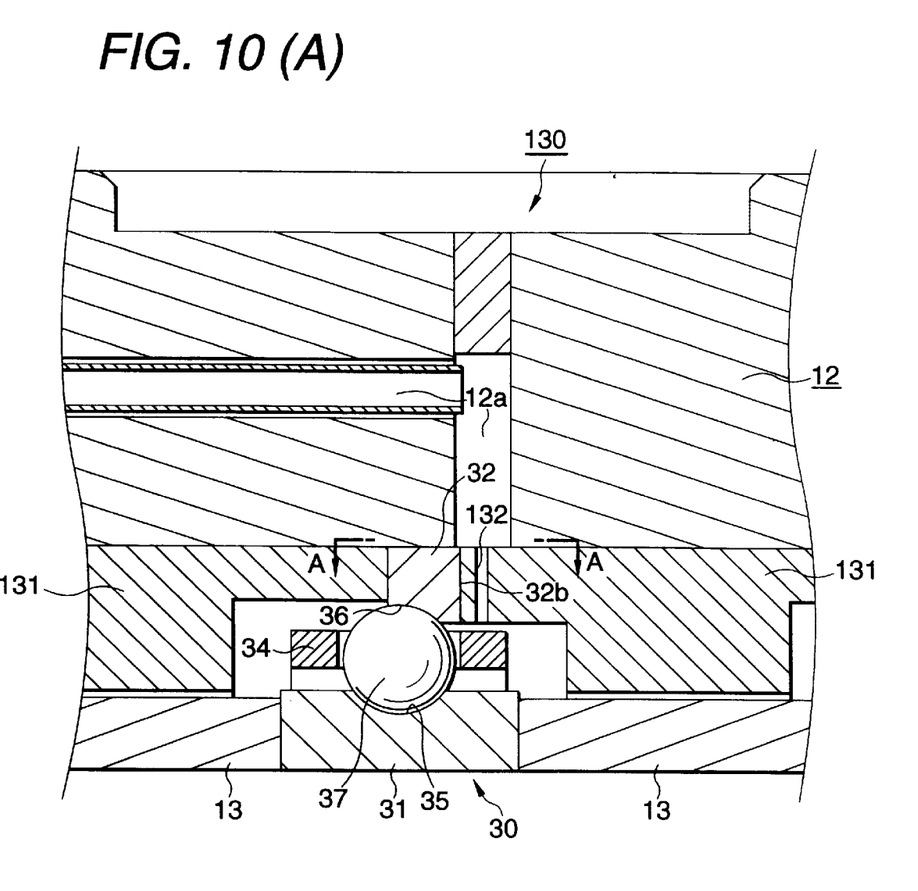
FIGS. 10(A) and 10(B) are section views of the main portions of an angular type ball bearing according to a ninth embodiment of the invention; and, FIG. 11 is a section view of a shaft support structure to which a conventional angular type ball bearing is applied.

Now, FIG. 10(A) is a section view of the main portions of a shaft support structure 130 to which an angular type bearing according to a ninth embodiment of the invention is applied.

In the shaft support structure 130 according to the present embodiment, in the vicinity of the end portion of an outer-ring-spacer 131 which is disposed so as to be opposed to the load-side portion 32b of an outer ring 32, there is disposed an oil supply nozzle hole 132 in such a manner that it penetrates through the outer-ring-spacer 131 end portion in the radial direction of a housing 12. In the present embodiment, specifically, three oil supply nozzle holes 132 are disposed in each bearing 30 at regular intervals in the peripheral direction thereof. =Now, FIG. 10(B) is a section view of the main portions of the present shaft support structure 130, taken along the arrow line A—A shown in FIG. 10(A). The shape of the cross section of each of the oil supply nozzle holes 132 formed in the vicinity of the end portions of the outer-ring-spacer 131 is formed substantially circular.

In the above-structured shaft support structure 130, since the oil supply nozzle holes 132 are disposed in the vicinity of the end portions of the outer-ring-spacer 131 which is in contact with the vicinity of the load-side portion of the outer ring 32, there can be provided a pseudo outer ring oil supply system, thereby being able to enhance the supply efficiency of the lubricating oil to the bearing 30.

By the way, in the present embodiment, three oil supply nozzle holes 132 are disposed in the peripheral portion of each bearing 30 at regular intervals. However, this is not limitative but one or more oil supply nozzle hole 132 may be disposed in each bearing 30. Also similarly to the previously described sixth embodiment, there can also be disposed a nozzle frame or an O ring in an oil supply passage 12a formed in the housing 12.

The remaining portions of the structure and operation of the ninth embodiment are similar to those of the previously described fourth embodiment.

As has been described hereinbefore, according to the illustrated respective embodiments of the invention, the anti-load-side end portions (in FIG. 2, the left end portions) of the outer rings 32, 53 of the bearings 30, 51 are respectively situated nearer to the balls 37 (in FIG. 2, nearer to the right side thereof) existing in the axial direction of the main shaft 11 than the load-side end portions (in FIG. 2, the left end portions) of the inner rings 31, 52.

Therefore, while every embodiment consists of a simple structure and is able to reduce the manufacturing cost thereof, it is also able to secure the desirable property of supplying and discharging the lubricating oil to and from the respective bearings 30, 51, thereby being able to secure the ideal property of lubricating the main shaft 11. Thanks to this, not only the temperature rise of the bearing but also the required rotation torque of the main shaft can be reduced.

Also, because the outer rings 32, 53 of the bearings 30, 51 are respectively short in the width-direction dimension, the outer rings 32, 53 are hard to be deformed when the cover body 16 is tightened to the housing 12. This makes it possible to surely prevent the raceway grooves 36 of the outer rings 32, 53 from being deformed, thereby being able to prevent the lowered running accuracy of the main shaft 11 that could be otherwise caused by the deformed raceway grooves 36 of the outer rings 32, 53.

Thus, the enhanced running accuracy of the main shaft 11 can improve the rotation precision of the main shaft 11 to a great extent, which makes it possible to improve the working precision of the machine tool.

Also, according to the above-mentioned second embodiment, since the positions of the oil discharge holes 42 to be formed in the respective outer-ring-spacers 41 are set nearer to the balls 37, the oil discharge efficiency can be enhanced further.

Further, according to the above-mentioned third embodiment, the anti-load-side end portions of the inner rings 52 of the bearings 51 are situated nearer to the balls 37 existing along the axial direction of the main shaft 11 than the load-side end portions of the outer rings 53, and the inner-ring-spacers 54 are set smaller in thickness than the inner rings 52. Thanks to this, when the lubricating oil is supplied into the interior portions of the bearings 51 through the oil supply nozzle holes 17, there can be reduced the influence of air curtains, so that the oil supply efficiency can be enhanced further.

And, according to the above-mentioned fourth to ninth embodiments, when compared with a bearing employing a conventional outer ring oil supply system in which oil supply holes are disposed directly in the outer ring of the bearing, there can be obtained an equivalent oil supply effect. That is, without suffering from the influence of the air curtain, there can be obtained a high oil supply efficiency. Also, since the oil supply nozzle holes 71 can be worked easily, the manufacturing cost of the shaft support structure can be reduced.

As has been described heretofore, according to the invention, the anti-load-side end portions of the outer rings are situated nearer to the rolling bodies existing along the axial direction of the shaft to be supported than the load-side end portions of the inner rings.

Therefore, while the present shaft support structure consists of a simple structure and is able to reduce the manufacturing cost thereof, it can secure enhanced lubricating performance in lubricating the shaft to be supported thereby. This makes it possible to reduce the temperature rise of the bearing as well as the required rotation torque of the shaft to be supported. Also, since the outer rings are hard to be deformed, the running accuracy of the shaft to be supported can be enhanced.

Also, the anti-load-side end portions of the outer rings are situated nearer to the rolling bodies existing along the axial direction of the shaft to be supported than the load-side end portions of the inner rings and, at the same time, the anti-load-side end portions of the inner rings are situated nearer to the rolling bodies existing along the axial direction of the shaft to be supported than the load-side end portions of the outer rings. Thanks to this, while the present shaft support structure consists of a simple structure and is able to reduce the manufacturing cost thereof, it can secure enhanced lubricating performance in lubricating the shaft to be supported.

This makes it possible to reduce the temperature rise of the bearing as well as the required rotation torque of the shaft to be supported. Also, since the outer rings are hard to be deformed, the running accuracy of the shaft to be supported can be enhanced.

Further, the above-mentioned angular type ball bearings are disposed in two or more rows side by side along the axial direction of the shaft to be supported between the outer peripheral surface of the shaft to be supported and the inner peripheral surface of the housing, the inner-ring-spacers are respectively interposed between the inner rings of the ball bearings in the respective rows, and the outer-ring-spacers are respectively interposed between the outer rings of the ball bearings in the respective rows as well as between the outer ring of the endmost bearing and the end portion of the housing. Thanks to this, while the present shaft support structure consists of a simple structure and is able to reduce the manufacturing cost thereof, it can secure good property of lubricating the shaft to be supported. This can the temperature rise of the bearing as well as the required rotation torque of the shaft to be supported.

Also, the above-mentioned angular type ball bearings are disposed in two or more rows side by side along the axial direction of the shaft to be supported thereby between the outer peripheral surface of the shaft to be supported and the inner peripheral surface of the housing, the inner-ring-spacers are respectively interposed between the inner rings of the ball bearings in the respective rows, the outer-ring-spacers are respectively interposed between the outer rings of the ball bearings in the respective rows as well as between the outer ring of the endmost bearing and the end portion of the housing, and the oil discharge holes for discharging the lubricating oil are respectively formed at the given positions of the respective outer-ring-spacers in the vicinity of the rolling bodies. Thanks to this, similarly to the previous structure, while the present shaft support structure consists of a simple structure and is able to reduce the manufacturing cost thereof, it can secure good property of lubricating the shaft to be supported. This makes it possible to reduce the temperature rise of the bearing as well as the required rotation torque of the shaft to be supported.

Further, the above-mentioned angular type ball bearings are disposed in two or more rows side by side along the axial direction of the shaft to be supported thereby between the outer peripheral surface of the shaft to be supported and the inner peripheral surface of the housing, the inner-ring-spacers are respectively interposed between the inner rings of the ball bearings in the respective rows, the outer-ring-spacers are respectively interposed between the outer rings of the ball bearings in the respective rows as well as between the outer ring of the endmost bearing and the end portion of the housing, and the oil supply holes for supplying the lubricating oil are respectively formed at the given positions of the respective outer-ring-spacers in the vicinity of the anti-load-side end portions of the outer rings. Thanks to this, similarly to the previous structures, while the present shaft support structure consists of a simple structure and is able to reduce the manufacturing cost thereof, it can secure good property of lubricating the shaft to be supported thereby. This makes it possible to reduce the temperature rise of the bearing as well as the required rotation torque of the shaft to be supported.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A shaft support structure comprising:
    a plurality of angular type ball bearings which supports a shaft and are aligned in an axial direction of said shaft, wherein each of said bearings comprising:
        an inner ring;
        an outer ring;
        a ball row defined by a plurality of balls, each of said balls rollably inserted into a raceway formed between said inner and outer rings; and
        a retainer disposed between said inner and outer rings and rollably retaining said balls therebetween,
        wherein the anti-load-side end portion of said outer ring is situated nearer to said ball row than the load-side end portion of said inner ring in an axial direction of said ball bearing, and
        further wherein the anti-load-side end portion of said inner ring is situated nearer to the ball row than the load-side end portion of said outer ring in the axial direction of said ball bearing.

2. The shaft support structure according to claim 1, wherein a width of said outer ring is smaller than a width of said inner ring in the axial direction of said ball bearing.

3. A shaft support structure comprising:
    a plurality of angular type ball bearings which supports a shaft and are aligned in an axial direction of said shaft, wherein each of said bearings comprising:
        an inner ring;
        an outer ring;
        a ball row defined by a plurality of balls, each of said balls rollably inserted into a raceway formed between said inner and outer rings; and
        a retainer disposed between said inner and outer rings and rollably retaining said balls therebetween,
        wherein the anti-load-side end portion of said outer ring is situated nearer to said ball row than the load-side end portion of said inner ring in an axial direction of said ball bearing, and further comprising:
        at least one inner-ring spacer interposed between the adjacent inner rings; and
        at least one outer-ring-spacer interposed between the adjacent outer rings.

4. The angular type ball bearing according to claim 3, wherein a width of the outer ring is smaller than a width of said inner ring in the axial direction of said ball bearing.

5. The shaft support structure according to claim 3, further comprising:
    a housing rotatively accommodating said shaft;
    a cover fixed to the end portion of the housing in the axial direction of said shaft;
    an additional outer-ring-spacer interposed between the endmost outer ring in the axial direction and said cover.

6. The shaft support structure according to claim 5, wherein said at least one inner-ring-spacer and said at least one outer-ring-spacer are made of a material having high thermal conductivity.

7. The shaft support structure according to claim 3, wherein at least one oil discharge hole for discharging lubricating oil is formed at a given position of the outer-ring-spacer in the vicinity of the ball.

8. The shaft support structure according to claim 3, wherein at least one oil supply hole for supplying lubricating oil is formed at given position of said outer-ring-spacer in the vicinity of the anti-load-side end portion of the outer ring.

9. The shaft support structure according to claim 8, wherein a plurality of oil supply hole are formed at given positions of the outer-ring-spacer in the vicinity of the anti-load-side end portion of said outer ring and are aligned at a predetermined interval in a peripheral direction of said bearing.

* * * * *